*J. W. Hoard,*
*Steam Trap Valve.*
N° 20,388.   Patented May 25, 1858.
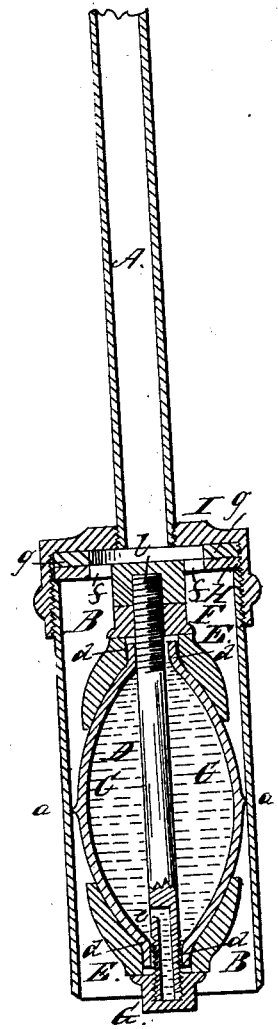

UNITED STATES PATENT OFFICE.

J. W. HOARD, OF PROVIDENCE, RHODE ISLAND, ASSIGNOR TO HIMSELF AND G. B. WIGGIN, OF SAME PLACE.

STEAM-TRAP VALVE.

Specification of Letters Patent No. 20,388, dated May 25, 1858.

*To all whom it may concern:*

Be it known that I, J. W. HOARD, of the city of Providence, in the county of Providence and State of Rhode Island, have invented a new and Improved Steam-Trap Valve; and I do hereby declare that the following is a full, clear, and exact description of the same, reference being had to the accompanying drawing, representing a central vertical section of the valve and its chamber.

This invention consists in a certain construction of a hollow valve of india rubber or other flexible material which is filled with alcohol, mercury, or other liquid by whose expansion the escape of the steam is permitted and by whose contraction the escape of the water of condensation is permitted, whereby the said valve is prevented expanding in any but the proper direction and provision is made for filling it.

To enable others to make and use my invention I will proceed to describe its construction and operation.

A, represents the extremity of the train or coil of steam pipe, having attached the valve chamber B, which consists of a hollow cylinder of metal open at the bottom but closed at the top except to the pipe A, by a cap I.

C, is the valve consisting of a hollow spheroid of vulcanized india rubber with an opening at each end to receive the metal stem D, and with a slight projection a, a, extending around its largest part. The metal valve stem D, is screwed at each end and each end of the valve is secured to the stem by binding it thereto by thread or wire wound around the necks d, d, which are formed around the openings in its ends, the screw threads b and c, on the stem forming surfaces of such character as to prevent the slipping of the necks, a, a, thereon.

E, are metal caps having their interiors formed to fit over considerable portions of the upper and lower parts of the spheroid of india rubber and with openings in them to fit tightly over the necks d, d.

F, and G, are nuts screwing on to the screw threads b and c, to confine the cups to the valve that they may prevent its expansion longitudinally or in the direction of the axis of the cylindrical chamber B. The lower portion of the valve stem D, is made hollow for some distance, from the extremity and with an opening e, in one side leading to the hollow interior of the valve, for the purpose of filling the said interior with alcohol, mercury, or other liquid, the filling being effected by turning the valve upside down and pouring the liquid in at the hollow end of the stem before the valve is placed in the chamber.

The nut G, is made in the form of a cap to close the hollow end of the valve stem to confine the liquid within the valve.

H, is a flange screwed on to the end of the screw thread b, which projects through the nut F, the said flange resting on the upper end of the chamber, and being secured thereto by screwing on the cap I, with a washer g, between it and the top of the chamber. The flange I, has openings f, f, provided in it for the steam or water from the pipe A, to enter, the chamber B, and surround the valve. This flange I, serves to attach the valve to the chamber. The exterior of the projection a, a, on the valve is of such size that it will not touch the sides of the chamber except when the valve is surrounded by steam which being at a temperature above 212° heats the liquid contents of the valve till they expand and cause a sufficient lateral expansion of the valve B, against the sides of the chamber to prevent any escape between the said sides and the valve. The valve chamber B, containing the valve is placed in the water tank commonly employed to collect the water of condensation from the coil or train of steam pipes.

The operation is as follows. When the steam from the boiler first enters the steam pipes, the cool surfaces of the pipes cause a considerable amount of condensation, and the water of condensation in the descending pipes running down into the valve chamber B, escapes around the valve C, into the tank, but as soon as the pipes become heated sufficiently to prevent condensation the steam reaching the chamber B, and surrounding the valve C, heats its liquid contents and causes their expansion to such a degree that the valve which is confined longitudinally by the caps E, E, and otherwise kept stationary expands laterally into contact with the sides of the chamber B, and thus prevents the escape of steam. When steam is no longer generated in the boiler or when at any time condensation takes place in the pipes, the water of condensation reaching the valve cools its contents and causes its contraction to such a degree that it ceases to close the passage between it and the sides of the chamber, and thus provides for the escape of the water to the tank.

This trap valve is more simple in its construction than the trap valves commonly employed, as levers, floats and all mechanism are dispended with; and it is found in practice to be more certain in its operation and less liable to get out of order.

What I claim as my invention and desire to secure by Letters Patent is—

The construction of the valve substantially as described with a metal stem part of which is hollow and communicates with the hollow interior of the valve, and is fitted with a hollow cap G, which also serves as a nut to secure the valve against longitudinal expansion whereby provision is made for filling it with liquid and confining such liquid therein.

J. W. HOARD.

Witnesses:
W. TUSCH,
MICH. HUGHES.